C. DAVIS.
FISHING BOB.
APPLICATION FILED MAY 16, 1910.
992,341.
Patented May 16, 1911.
Fig. 1
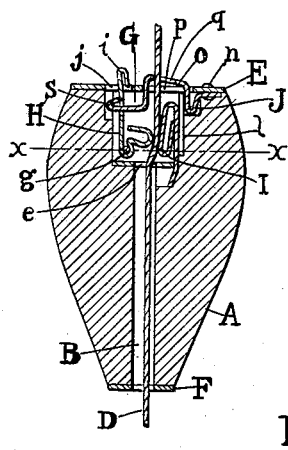
Fig. 2
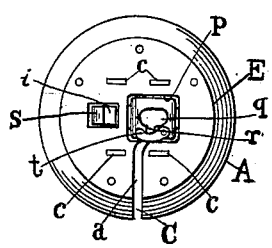
Fig. 3
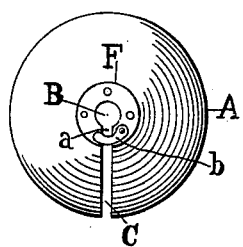
Fig. 5
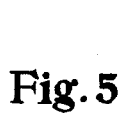
Fig. 8
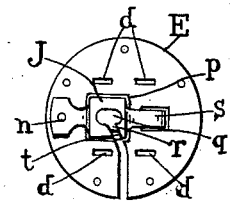
Fig. 4
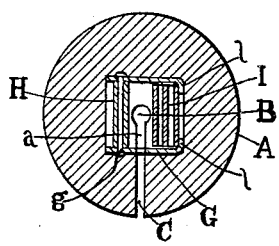
Fig. 7
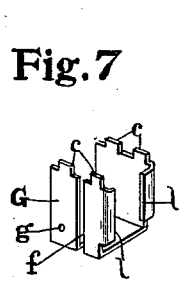
Fig. 6
Witnesses
C. M. Shannon.
A. M. Dorr.
Inventor
CAL DAVIS
By
Attorneys

UNITED STATES PATENT OFFICE.

CLAWSON DAVIS, OF YPSILANTI, MICHIGAN, ASSIGNOR OF TWO-THIRDS TO JOSEPH S. SMITH AND JOHN R. SMITH, OF YPSILANTI, MICHIGAN.

FISHING-BOB.

992,341. Specification of Letters Patent. Patented May 16, 1911.

Application filed May 16, 1910. Serial No. 561,714.

*To all whom it may concern:*

Be it known that I, CLAWSON DAVIS, a citizen of the United States of America, residing at Ypsilanti, in the county of Washtenaw and State of Michigan, have invented certain new and useful Improvements in Fishing-Bobs, of which the following is a specification, reference being had therein to the accompanying drawings.

This invention has reference to a fishing bob for use in hook and line fishing and it consists in the novel construction, arrangement and operation of the bob whereby it may be readily adjusted to any desired position upon the line and also automatically releases the line in the act of reeling it in, all more fully hereinafter described and shown in the accompanying drawings, in which—

Figure 1 is a vertical central section through a bob embodying my invention; Figs. 2 and 3 are top and bottom views thereof respectively; Fig. 4 is a horizontal section on line $x$—$x$, Fig. 1; and Figs. 5, 6, 7 and 8 are detached views of the several parts composing the line clamp and trip as indicated by the letters of reference, Fig. 8 showing the under side of the top plate.

As indicated by reference letters in the drawings A represents a bob of suitable buoyant material, a central bore B and a lateral slit C communicating therewith being provided for engaging it with a fish line D. The top and bottom of the bob are respectively covered by metal plates E, F centrally apertured in line with the bore B and provided with radial slots $a$ registering with the slit C, the bottom plate being also provided with a latch $b$ for opening and closing the slot $a$.

The upper end of the bore B is enlarged to receive a metallic casing G which is secured to the underside of the top plate by means of lugs $c$ engaging into corresponding apertures $d$ in the top plate. The casing is provided in its bottom with an aperture $e$ registering with the bore B and with a slot $f$ extending therefrom through the side of the casing and registering with the slit C of the bob. Within this casing is pivotally secured at $g$ a lever H one arm of which forms a lateral clamping jaw $h$ while the other arm extends vertically upward and terminates in a finger piece $i$ which works within an opening $j$ in the top plate. It is also provided with an aperture $k$. To the clamping jaw $h$ is opposed a spring cushion jaw I consisting of a strip of spring sheet metal looped upon itself and held in position in the casing by means of flanges $l$ on the casing and by a heel extension $m$.

J is a tripping latch made of a strip of spring sheet metal secured at $n$ to the top plate, its free end terminates in a hook $s$ adapted to project through the aperture $k$ of the lever jaw and coöperates therewith to lock the lever jaw in position. The middle portion of the trip latch is provided with an upward bend $o$ which projects outwardly through an opening $p$ in the top plate and is provided with an aperture $q$ for the passage of the line and a slot $r$ registering with the slot $a$ in the top plate and provided with a closing latch $t$.

The bob being thus constructed the operation of attaching it to the line is self evident from its construction. The position of the parts in Fig. 1 show the bob fastened upon the line by being clamped between the lever jaw H and the spring jaw I, the lever jaw being locked in position by the tripping latch J. A slight pressure upon the portion $o$ of the tripping lever therefore will cause the clamps to spring open and free the line so that the bob may be freely shifted to any desired position on the line. However it is obvious that the bob may be shifted without releasing the clamp, since it is only held by frictional engagement with the line, the rounding parts of the clamp preventing the chafing of the line.

In reeling in the line the tripping latch in striking the end of the fishing pole will be automatically actuated and the jaws will be released from clamping the line and permit the same to run freely through the bob onto the reel. The exposed surfaces of the body if made of wood are covered with a water proofing paint.

What I claim as my invention is:—

1. The combination with the body of a fishing bob having a line receiving bore, of a line clamping device in the path of the bore and embodying a fixed jaw and a hinged jaw in self opening relation thereto, the hinged jaw provided with a finger piece for manual operation and a spring actuated tripping latch coöperating with the hinged jaw to lock the same into clamping position.

2. The combination with the body of a fishing bob having a line receiving bore, of a line clamping device in said body near the top thereof and comprising a fixed jaw and a hinged jaw in self opening relation thereto, and a spring actuated tripping latch coöperating with the hinged jaw to lock the same into clamping position, said tripping latch crossing the path of the line and forming a projecting part of the bob on top thereof.

3. The combination with the body of a fishing bob having a line receiving bore, of a line clamping device at one end of the bore and comprising a spring cushion forming one clamping member, a pivoted clamping lever forming the other member and provided with a finger piece for manual operation, and a spring actuated tripping latch adapted to lock said lever in clamping position.

4. The combination with the body of a fishing bob having a line receiving bore and a longitudinal slit leading into the bore and through both of which the line may pass freely, a line clamping device within the upper end of the bob in the path of the bore and comprising two members, the clamping faces of which register with the slit in the bob, and a tripping lever transversely said clamping members and provided with an aperture communicating with the slit in the bob.

5. The combination with the body of a fishing bob having a line receiving bore and a longitudinal slit leading into the bore and through both of which the line may pass freely, a tripping device in the path of the bore and consisting of a casing secured in an enlargement of the bore, a spring cushion in said casing forming the stationary member of the clamp, a lever pivoted in the casing and forming the movable member of the clamp, an actuating finger piece on said lever, and a spring actuated tripping lever adapted to lock the movable member into clamping position, said tripping lever projecting outwardly through the top of the bob and provided with an aperture for the line.

In testimony whereof I affix my signature in presence of two witnesses.

CAL DAVIS.

Witnesses:
 LEWIS E. FLANDERS,
 OTTO F. BARTHEL.

Copies of this patent may be obtained for five cents each, by addressing the "Commissioner of Patents, Washington, D. C."